Dec. 5, 1967  B. A. LIBBERT  3,356,523
POLYSTYRENE FILM CONTAINING AN ANTIREFLECTION COATING
Filed Feb. 10, 1964  2 Sheets-Sheet 1
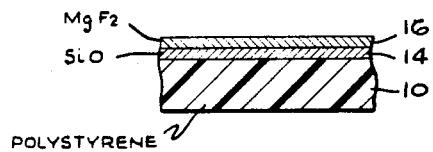
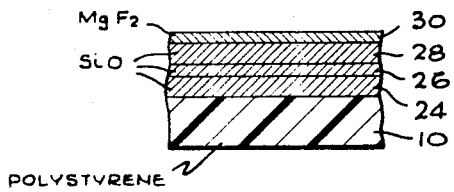
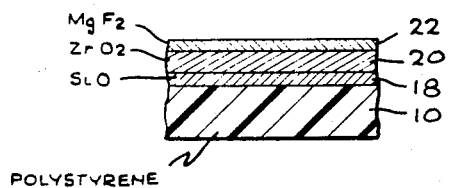
BARBARA A. LIBBERT
INVENTOR.
BY Max Geldin
ATTORNEY

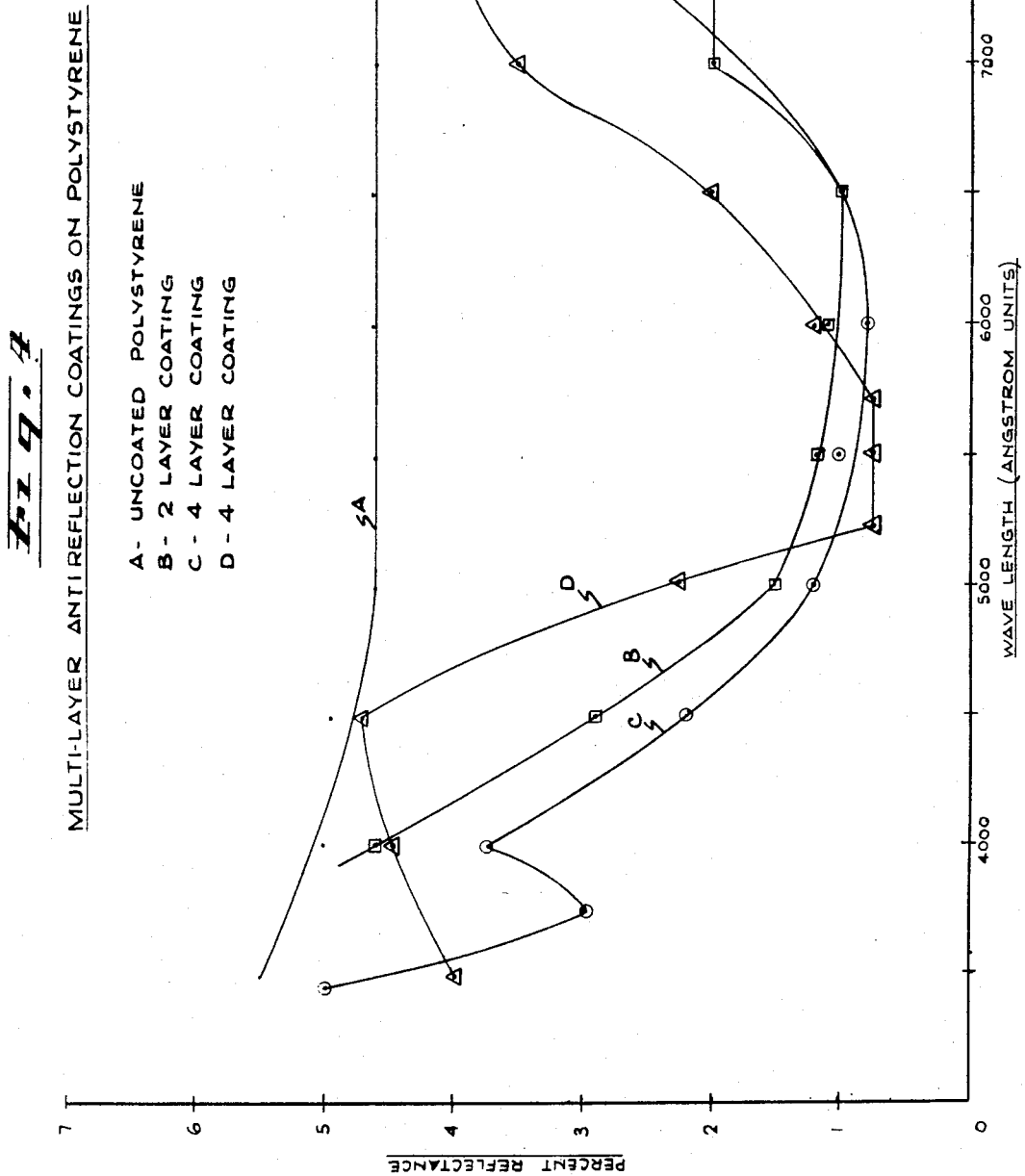

United States Patent Office 3,356,523
Patented Dec. 5, 1967

3,356,523
POLYSTYRENE FILM CONTAINING AN
ANTIREFLECTION COATING
Barbara A. Libbert, Los Angeles, Calif., assignor, by mesne assignments, to McDonnell Douglas Corporation, Santa Monica, Calif., a corporation of Maryland
Filed Feb. 10, 1964, Ser. No. 343,674
11 Claims. (Cl. 117—33.3)

ABSTRACT OF THE DISCLOSURE

This invention is directed to a polystyrene sheet or film containing a multilayer antireflection coating formed from inorganic dielectrics, such as a combination of silicon monoxide and magnesium fluoride, said coating being strongly adherent to the polystyrene substrate and having good abrasion-resistance properties. Such coated films have application, for example, as a light lens or as a light transmission medium over a cathode ray tube.

---

This invention relates to coated polystyrene resin, and is particularly concerned with transparent polystyrene plastic film or sheet having an antireflection coating thereon.

Polystyrene thermoplastic film and sheeting are well-known commercially available materials. Relatively wide usage has been made of polystyrene sheets and films due to the physical properties of this material, including its excellent dimensional stability and satisfactory strength, and its good thermal and electrical properties. Also, polystyrene sheet or film can be bonded to itself or to other materials, e.g., by cementing with suitable adhesives, or by heat sealing or press welding. Of particular importance, transparent polystyrene sheets and films have good optical clarity, and have high light-transmission characteristics over the visible spectrum. Hence, for example, polystyrene films and sheets can be used as light lenses and light-transmission films when applied over cathode ray tubes.

However, in many optical applications of polystyrene film, such as when applied as a light lens or as a light-transmission medium over a cathode ray tube, minimum surface reflection of light from the polystyrene film or sheet is highly desirable. Although transparent polystyrene films have a reflectance comparable to that of glass, the reflectance of such polystyrene films being about 4.5% to about 5% over the visible spectrum, in the above-noted applications, it is important that such surface reflectance be substantially reduced for maximum efficiency in use.

It is known to apply antireflection coatings to glass. In such coating processes, it is necessary to maintain the substrate, that is, the glass, at a substantially elevated temperature, e.g., of the order of 600° F. during the deposition of the coating material on the glass in order to form adherent abrasion-resistant films. It is, of course, not possible to maintain the polystyrene film or sheet at the above-noted elevated temperatures due to disintegration of the substrate at such high temperatures. Further, when it is attempted to heat such plastic materials even at lower temperatures, the phenomenon known as "outgassing" of the plastic occurs involving the release of gases from within the plastic and from the surface thereof, causing pitting and irregularities in the coating and rendering it difficult to apply a coating to the plastic surface under these conditions. Further, vaporized molecules of coating materials produced in the coating process tend to strike the plastic substrate in a manner such as to cause pitting or deformation of the surface.

One object of the invention accordingly is to provide a polystyrene film or sheet with an adherent efficient antireflection coating.

A further object is to provide a transparent polystyrene film having a multilayer antireflection coating formed from inorganic dielectric materials, such coating substantially reducing the reflectance of the polystyrene substrate below its reflectance value in the absence of such coating.

A still further object is to provide a polystyrene film or sheet containing a multilayer antireflection coating which is adherent, abrasion-resistant and which is smooth and uniform over substantially the entire surface of the polystyrene film.

Yet another object is the provision of procedure or technique for applying an antireflection coating, preferably an inorganic dielectric coating, to the surface of a polystyrene film, without adversely affecting the physical characteristics, including strength and surface smoothness of the polystyrene material.

Other objects and avantages will be apparent hereinafter.

I have now surprisingly found that an efficient adherent antireflection coating can be applied to a polystyrene sheet or film. Such antireflection coatings or films are multilayer coatings formed from inorganic dielectrics, for example, a combination of magnesium fluoride and silicon monoxide, are strongly adherent to the polystyrene substrate, and have good abrasion-resistance properties. Such multilayer antireflection coatings applied to the polystyrene film or sheet have been found to reduce the surface reflectance thereof to a low value less than 2%, usually of the order of about 1% or less, e.g., down to about ½%. Of particular significance such low surface reflectance values of the polystyrene-antireflection coating system are generally achieved over a substantial or major portion of the visible spectrum, and in many instances over substantially the entire visible spectrum of from about 4,000 to about 7,500 A.

It has been found that single-layer antireflection coatings, e.g., a single magnesium fluoride layer, on polystyrene, not only are poorly adherent and have inferior abrasion resistance, as compared to the multilayer antireflection coatings of the invention, but that such multilayer coatings reduce the reflectance of the polystyrene film over the major portion of the visible spectrum to a substantially greater extent as compared to the above-noted single layer antireflection coating. Further, multilayer antireflection coatings on polystyrene are much more versatile than single-layer coatings in that combinations of the different dielectric materials employed in producing such multilayer coatings can be chosen so as to obtain a minimum desired composite refractive index, which together with a pre-selected optical thickness for the respective layers, will result in an anti-reflection coating which confers minimum reflectance on the polystyrene-antireflection coating system.

It has been found that such antireflection coatings can be deposited upon the polystyrene substrate rapidly and efficiently, while maintaining the substrate at substantially ambient temperature, and preferably at somewhat elevated temperature of the order of about 100° F. Under these conditions, the vaporized particles of the dielectric coating materials are deposited upon the polystyrene film surface without damaging the smooth surface characteristics of the substrate, and with a minimum of outgassing of the polystyrene occurring.

The polystyrene film or sheet substrate on which the antireflection coating is deposited can be of varying thickness. Thus, for example, commercially available transparent polystyrene film which can be employed can have a thickness of from about 1 to about 10 mils. Antireflection films can, however, be deposited on polystyrene sheets of thickness less than or greater than the thicknesses noted above. Hence, the term "film" or "sheet" as applied to the polystyrene substrate is intended to denote herein a substrate of any desired thickness.

The multilayer antireflection or interference coatings formed on the polystyrene substrate, according to the invention, are formed from dielectric materials, preferably inorganic, having a low index of refraction and good evaporation qualities so as to be readily vaporized and deposited upon the surface of the substrate and to form a highly transparent stable substance thereon. Antireflection dielectric materials which can be employed according to the invention include, for example, magnesium fluoride, silicon monoxide, cryolite (sodium aluminum fluoride), zirconium dioxide, stannic oxide, and cerium oxide. The refractive index of each of the above-noted materials at 5500 A. (Angstrom units) are set forth in Table I below.

TABLE I

| Dielectric substance: | Refractive index at 5500 A. |
|---|---|
| $MgF_2$ | 1.38 |
| SiO (deposited slowly and oxidized) | 1.6–1.8 |
| SiO (deposited quickly and unoxidized) | 2.10 |
| $Na_3AlF_6$ (cryolite) | 1.30–1.33 |
| $ZrO_2$ | 2.1 |
| $SnO_2$ | 2.1 |
| $CeO_2$ | 2.1 |

The above-noted materials can be employed to form multilayer coatings composed of two or more of the above-noted dielectric materials, for example, a combination of magnesium fluoride and silicon monoxide.

For a single coating of dielectric, in order to substantially eliminate reflectance, the index of refraction of the coating must be equal to the square root of the index of refraction of the substrate, i.e., $$n_c = \sqrt{n_s}$$

where $n_c$ equals the refractive index of the coating and $n_s$ the refractive index of the substrate. Since the refractive index of polystyrene resin is about 1.53 (at 5500 A.), it is thus seen that the refractive index of the dielectric forming a single layer antireflection coating must be less than 1.53. There are only a relatively few suitable dielectrics which satisfy this criterion, such as magnesium fluoride or cryolite, but as previously noted, single antireflection layers of these respective dielectrics are non-adherent to polystyrene, and do not reduce reflection of the polystyrene substrate to the desired low values over the visible spectrum.

On the other hand, the application of multilayer antireflection coatings on the polystyrene substrate, according to the invention, permits the choice of a combination of the above-noted dielectrics for the respective layers such that the composite refractive index for the multilayer system is substantially less than the refractive index $n_s$ of the substrate. In addition, multilayer coatings provide a reduction of reflection over a broad band width of the visible spectrum or over substantially the entire visible spectrum.

In order to produce an efficient antireflection multilayer coating on the polystyrene substrate, each layer of the antireflecting coating should have an optical thickness of ¼λ (lambda) or multiples thereof where λ is the wavelength at which the thickness is to be controlled, and which can be any wavelength within the visible spectrum and can conveniently be chosen at about 5500 A., approximately the middle of the visible spectrum. Thus, for example, 2-, 3- and 4-layer antireflection coatings on the polystyrene substrate can be formed, providing coatings for which the resulting polystyrene-antireflection coating systems will have minimum reflectance at the chosen wavelength, for example, 5500 A., and will exhibit substantially reduced reflectance as compared to the polystyrene film in the absence of the coating. Each layer of these multiple-layer antireflection coatings can have an optical thickness of, for example, ¼λ, ½λ, or ¾λ, the dielectric material forming the respective layers and the thickness of the respective layers being chosen so as to obtain minimum reflectance. Mixtures of the aforementioned dielectrics can also be employed for producing the respective layers of the multilayer antireflecting coating in order to obtain a desired refractive index for each of such layers. Thus, for example, a mixture of magnesium fluoride and silicon monoxide can be employed to form one of the layers of the multilayer antireflection coating. A particular advantage of the use of a multilayer antireflection coating on the polystyrene is in the increased reduction of reflectance over a substantially greater portion of the visible spectrum as compared to a single-layer antireflection coating.

In the process of applying the various layers of antireflection coating to the polystyrene substrate, the dielectric material, e.g., magnesium fluoride employed in forming one of the layers, is placed in a metal boat, e.g., a tantalum boat, and such boat, together with the substrate or polystyrene film to be coated, is positioned within a confined zone or chamber such as a bell jar, which is evacuated, e.g., by an oil diffusion pump. The boat containing the solid dielectric is heated by electrical resistance to a temperature at which the dielectric is vaporized, and the vaporing zone is subjected to a high vacuum of the order of about $10^{-4}$ to about $10^{-5}$ mm. mercury. A high vacuum is employed in order to obtain minimum interference between the vaporized molecules or particles and the molecules of air, and also to prevent reaction of the highly reactive vapor particles heated to high temperature, with air molecules.

It is important that precautions be taken so that the polystyrene substrate in the evacuated zone containing the heated dielectric be positioned with respect to the vaporization source such that there is a minimum heat transfer by radiation from the dielectric being vaporized to the substrate. However, the polystyrene substrate should not be positioned so far from the vaporization source that only a scattering of vapor molecules impinges on the surface, since it is important that the vapor in concentrated form strike the surface of the substrate in order to produce an efficient, uniform coating. This is accomplished usually by placing the polystyrene film about 10 to 12 inches away from or above the vapor source. It is preferred to maintain the polystyrene substrate at approximately or slightly above ambient temperature, preferably at a temperature of about 100° F. The maintenance of the substrate at about 100° F. is believed to assist in causing greater adherence of the dielectric coating to the substrate and to provide greater abrasion resistance of the antireflection coating. Suitable means such as a baffle or a chimney can be employed to direct radiation from the vapor source down and away from the polystyrene substrate.

The thickness of the respective antireflection coating layers deposited to form the multilayer antireflection coating can be monitored by any suitable means such as by measuring the reflectance of the respective coatings with monochromatic light (at 5500 A.), by a rapid-scan spectrophotometer which shows reflectance versus wavelength on a cathode ray tube during film deposition, or by a modulated beam photometer. It has been found most convenient to monitor the optical thickness of the respective layers of the multilayer antireflection coating deposited on the polystyrene substrate by means of a modulated beam photometer, e.g., an Edwards High Vacuum Ltd. modulated beam photometer, which measures the minimum reflectance at a wavelength within a narrow band width region, e.g., approximately 5500 A.

In producing multilayer antireflection coatings, when the predetermined optical thickness of one layer of deposited dielectric material on the substrate is attained, heating of the vaporization source of such dielectric is discontinued, and without breaking vacuum another dielectric is heated to vaporization temperature to produce vapors which are deposited on the substrate to a predetermined optical thickness to form the next layer of the multilayer coating, and so on, until the desired number of layers are formed.

The following are examples of practice of the invention.

In the drawing, FIGS. 1, 2 and 3 illustrate schematically and in an exaggerated manner for greater clarity, a polystyrene substrate film having antireflection coatings thereon composed of a double, quadruple and triple layer, respectively. FIG. 4 is a plot of percent reflectance against wavelength in the visible spectrum for the coatings produced in Examples 1 to 3 below.

*Example 1*

A double layer antireflection coating is firmed on a polystyrene film substrate having a thickness of about 7 to about 10 mils, by first depositing a silicon monoxide coating 14 on the substrate 10, as illustrated in FIG. 1, the silicon monoxide being of the type which is deposited slowly and oxidized, and having a refractive index of about 1.7. The optical thickness of the initial silicon monoxide layer is monitored to ¼λ. A second coating 16 of magnesium fluoride is then deposited over the initial silicon monoxide layer to an optical thickness of ¼λ also. During the deposition of both of the layers 14 and 16, the polystyrene substrate is maintained at a temperature somewhat above ambient, of the order of about 100° F. The polystyrene substrate containing the double layer antireflection coating shown in FIG. 1 has a reflectance of about 1.2%, at 5500 A.

The magnesium fluoride in the second layer of the antireflection coating described above can be replaced by cryolite, providing an antireflection coating producing a reduction in reflectance similar to but somewhat greater than the antireflection coating described above.

*Example 2*

A four-layer antireflection coating is deposited on a polystyrene film, as indicated in FIG. 2, by depositing in succession three silicon monoxide layers, the first and third silicon monoxide layers 24 and 28 being monitored to an optical thickness of ½λ, and the second or intermediate silicon monoxide layer to an optical thickness of ¼λ. The first and third silicon monoxide layers are of the type wherein the SiO is deposited quickly and unoxidized, and having a refractive index of approximately 2.1, the intermediate silicon monoxide layer 26 being of the type wherein the SiO was deposited slowly and oxidized and has a refractive index of about 1.7.

The first SiO layer 24 of refractive index about 2.1 is deposited at a chamber pressure of about $1.4 \times 10^{-5}$ mm. mercury. Following deposition of layer 24 to the desired optical thickness of ½λ, the chamber pressure is increased to about $9 \times 10^{-5}$ mm. mercury, resulting in deposition of the second SiO layer 26 of refractive index of about 1.7 to the desired optical thickness of about ¼λ. Then the chamber pressure is again reduced back to about $1.4 \times 10^{-5}$ mm. mercury, resulting in deposition of the third SiO layer 28 of refractive index if about 2.1 to the desired thickness of ½λ.

A fourth antireflection layer 30 is applied over the third SiO layer 28, the fourth layer being magnesium fluoride deposited to an optical thickness of ¼λ.

The reflectance of the system of FIG. 2 composed of a four-layer antireflection coating on the polystyrene substrate is 1% at 5500 A.

*Example 3*

A four-layer antireflection coating on a polystyrene substrate is provided as in FIG. 2, and as described in Example 2 above, composed of three SiO layers and a top layer of MgF$_2$, except that in the present instance, the first and third silicon monoxide layers 24 and 28 are each deposited to an optical thickness of ¼λ, and the intermediate silicon monoxide layer 26 is deposited to an optical thickness of ½λ.

The reflectance of this alternative system comprising a polystyrene substrate and a four-layer antireflection coating is 0.75% at 5500 A.

The plot in FIG. 4 of the drawing shows the percent reflectance over the visible spectrum of the uncoated polystyrene film in comparison to the systems of FIGS. 1 and 2 as described in Examples 1 to 3 above for double and four-layer antireflection coatings.

From the plot in FIG. 4 it is seen that a substantial reduction in reflectance is obtained by the double-layer antireflection coating system of Example 1, as represented by curve B in the plot, as compared to the uncoated polystyrene represented by curve A, over the major portion of the visible spectrum.

Further, it is apparent that the four-layer materials described in Examples 2 and 3, and illustrated in FIG. 2 of the drawing, and whose reflectance curves are shown at C and D in FIG. 4, provide a greater reduction in reflectance over at least a significant portion of the visible spectrum as compared to the double-layer coating, represented by curve B. Of particular significance, it is seen that the reflectance of the four-layer coating indicated by curve C in the plot of FIG. 4 is lower over substantially the entire visible spectrum as compared to the reflectance of the two-layer coating represented by curve B, and is in the range of about 0.75% to slightly over 1% over a substantial portion of the visible spectrum, i.e., from about 5,000 A. to about 6,500 A.

The reflectance curves in FIG. 4 were obtained with a Cary 14 spectrophotometer and an integrating sphere reflectance attachment.

*Example 4*

A four-layer antireflection coating is formed on a polystyrene substrate film as described in Example 2, and illustrated in FIG. 2 of the drawing, except that in place of employing silicon monoxide as first and third layers, zirconium dioxide, stannic oxide, or cerium oxide, is employed for producing said first and third layers.

A polystyrene four-layer antireflection coating system is provided in each instance having a reflectance of the order of about 1% in the visible spectrum.

*Example 5*

A three-layer antireflection coating is deposited on a polystyrene film 10 by first depositing a silicon monoxide layer to an optical thickness of ¼λ, represented by numeral 18 in FIG. 3, such coating being of the type having a refractive index of about 1.7, then depositing a layer of zirconium dioxide 20 over the silicon monoxide layer 18, to an optical thickness of ½λ, followed by the deposition of a third dielectric layer 22 of magnesium fluoride to an optical thickness of ¼λ over the intermediate zirconium dioxide film. During deposition of the three layers 18, 20 and 22, the substrate 10 is maintained at a temperature not in excess of about 100° F.

The resulting antireflection coating formed on the polystyrene substrate is highly adherent and abrasion resistant, and has a lower reflectance in the visible spectrum of the order of about 1%.

*Example 6*

A three-layer antireflection coating is formed on a polystyrene substrate as described in Example 5 and illustrated in FIG. 3 of the drawing, except that in place of the zirconium dioxide intermediate layer, an intermediate layer of stannic oxide, cerium oxide, or silicon monoxide of refractive index 2.1 is provided, in each case to an optical thickness also of ½λ.

The antireflection coating thus formed, in which the intermediate layer of FIG. 3 is stannic oxide, cerium oxide, or silicon monoxide of refractive index of 2.1 is also an adherent, abrasion-resistant coating, such polystyrene-three-layer antireflection coating system having a reflectance of about 1% in the visible spectrum.

From the foregoing, it is seen that the invention provides a transparent polystyrene film or sheet having an efficient adherent abrasion-resistant antireflection coating thereon in the form of a multilayer coating which substantially reduces the reflectance of the polystyrene film as compared to the uncoated polystyrene, resulting in a transparent film having substantially improved optical characteristics and providing an efficient antireflecting optical medium of substantial application.

While I have described particular embodiments of my invention for the purpose of illustration, it should be understood that various modifications and adaptations thereof may be made within the spirit of the invention, as set forth in the appended claims.

I claim:

1. A transparent polystyrene substrate containing on a surface thereof a transparent multilayer antireflection coating comprising a first layer of silicon monoxide adjacent said substrate, and a second layer of magnesium fluoride over said first layer.

2. A transparent polystyrene substrate containing on a surface thereof a transparent multilayer antireflection coating comprising a first layer of silicon monoxide adjacent said substrate, and a second layer of cryolite over said first layer.

3. A transparent polystyrene substrate containing on a surface thereof a multilayer transparent antireflection coating comprising a first layer of silicon monoxide adjacent said substrate, and a second layer of magnesium fluoride over said first layer, each of said layers having an optical thickness of $\frac{1}{4}\lambda$, where $\lambda$ is a wavelength within the visible spectrum, said silicon monoxide layer having an index of refraction of about 1.6 to about 1.8.

4. A transparent polystyrene substrate containing on a surface thereof a multilayer transparent antireflection coating comprising three successive layers of silicon monoxide, each of said layers having a different index of refraction from an adjacent silicon monoxide layer, and a fourth layer of magnesium fluoride over the third layer of silicon monoxide.

5. A transparent polystyrene substrate containing on a surface thereof a four-layer transparent antireflection coating, the first layer adjacent said substrate and said third layer each being selected from the group consisting of zirconium dioxide, stannic oxide, cerium oxide, and silicon monoxide having an index of refraction of about 2.10, the second intermediate layer being a silicon monoxide layer having an index of refraction of about 1.6 to about 1.8, the fourth layer being magnesium fluoride.

6. A transparent polystyrene substrate containing on a surface thereof a four-layer transparent antireflection coating comprising three successive layers of silicon monoxide, the first layer adjacent said substrate and said third layer each having an index of refraction of about 2.10 and an optical thickness of $\frac{1}{2}\lambda$, the second intermediate silicon monoxide layer having an index of refraction of about 1.6 to about 1.8 and an optical thickness of $\frac{1}{4}\lambda$, and a fourth layer of magnesium fluoride over said third layer, said fourth layer having an optical thickness of $\frac{1}{4}\lambda$, said indices of refraction being at 5500 A. and wherein $\lambda$ is a wavelength within the visible spectrum.

7. A transparent polystyrene substrate containing on a surface thereof a four-layer transparent antireflection coating comprising three successive layers of silicon monoxide, the first layer adjacent said substrate and said third layer each having an index of refraction of about 2.10 and an optical thickness of $\frac{1}{4}\lambda$, the second intermediate silicon monoxide layer having an index of refraction of about 1.6 to about 1.8 and an optical thickness of $\frac{1}{2}\lambda$, and a fourth layer of magnesium fluoride over said third layer, said fourth layer having an optical thickness of $\frac{1}{4}\lambda$, said indices of refraction being at 5500 A. and wherein $\lambda$ is a wavelength within the visible spectrum.

8. A transparent polystyrene substrate containing on a surface thereof a three-layer transparent antireflection coating, comprising a first layer of silicon monoxide adjacent said substrate, said silicon monoxide layer having a refractive index of about 1.6 to about 1.8, a second layer of a dielectric material selected from the group consisting of zirconium dioxide, stannic oxide, cerium oxide, and silicon monoxide having an index of refraction of about 2.1, and a third layer of magnesium fluoride over said second layer.

9. A transparent polystyrene substrate containing on a surface thereof a three-layer transparent antireflection coating comprising a first layer of silicon monoxide adjacent said substrate, said silicon monoxide having an index of refraction of about 1.6 to about 1.8 at about 5500 A. and an optical thickness of $\frac{1}{4}\lambda$, a second layer of a dielectric selected from the group consisting of zirconium dioxide, stannic oxide, cerium oxide, and silicon monoxide having a refractive index of about 2.1 at 5500 A., said dielectric having an optical thickness of $\frac{1}{2}\lambda$, and a third layer of magnesium fluoride over said second layer, said magnesium fluoride having an optical thickness of $\frac{1}{4}\lambda$, where $\lambda$ is a wavelength within the visible spectrum.

10. A transparent polystyrene substrate as defined in claim 9, wherein said dielectric of said second layer is silicon monoxide having a refractive index of about 2.1.

11. A transparent polystyrene substrate as defined in claim 9, wherein said dielectric of said second layer is zirconium dioxide.

References Cited

UNITED STATES PATENTS

| | | | |
|---|---|---|---|
| 2,366,687 | 1/1945 | Osterberg | 117—71 X |
| 2,601,806 | 7/1952 | Turner | 117—33.3 X |
| 2,617,748 | 11/1952 | Bjorksten et al. | 117—33.3 |
| 2,624,238 | 1/1953 | Widdop et al. | 117—33.3 X |
| 2,641,954 | 6/1953 | Scharf et al. | 117—106 X |
| 2,758,948 | 8/1956 | Simon et al. | 117—33.8 |
| 2,858,240 | 1/1958 | Turner et al. | 117—33.3 X |
| 2,964,427 | 12/1960 | Rheinberger et al. | 117—33.3 |
| 3,185,020 | 5/1965 | Thelen | 117—33.3 X |

WILLIAM D. MARTIN, *Primary Examiner.*

T. G. DAVIS, *Assistant Examiner.*